Nov. 20, 1934.   A. W. KNIGHT   1,981,455
ELECTRICAL PRECIPITATOR
Filed March 14, 1932   4 Sheets-Sheet 1
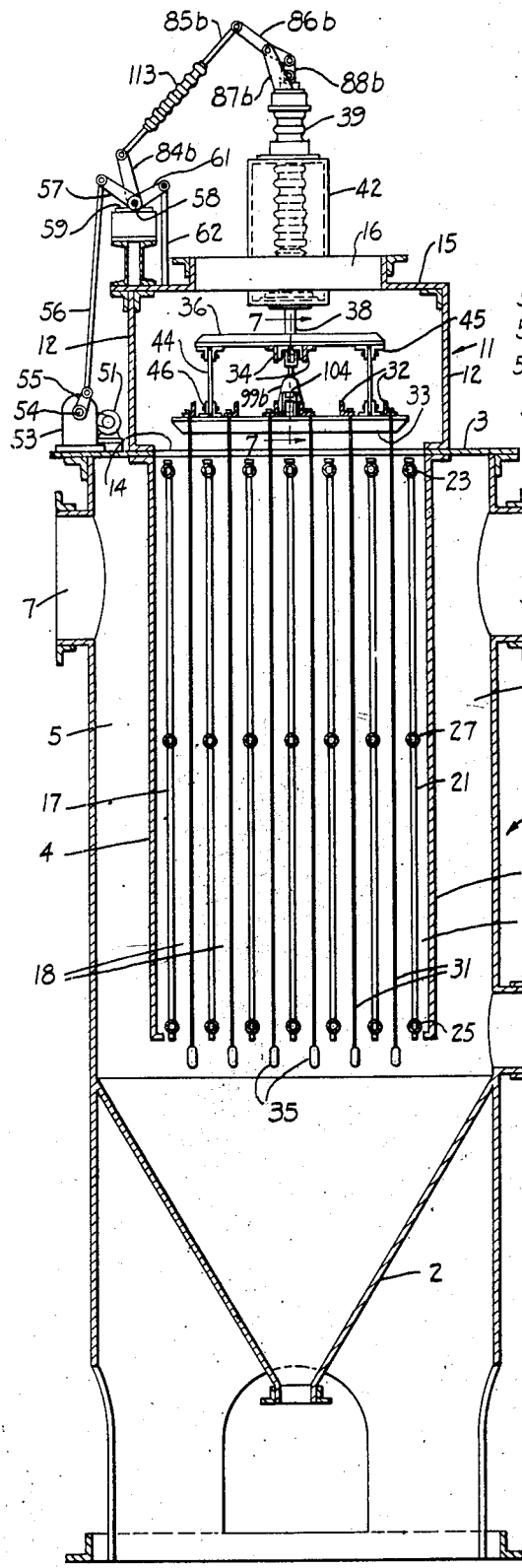
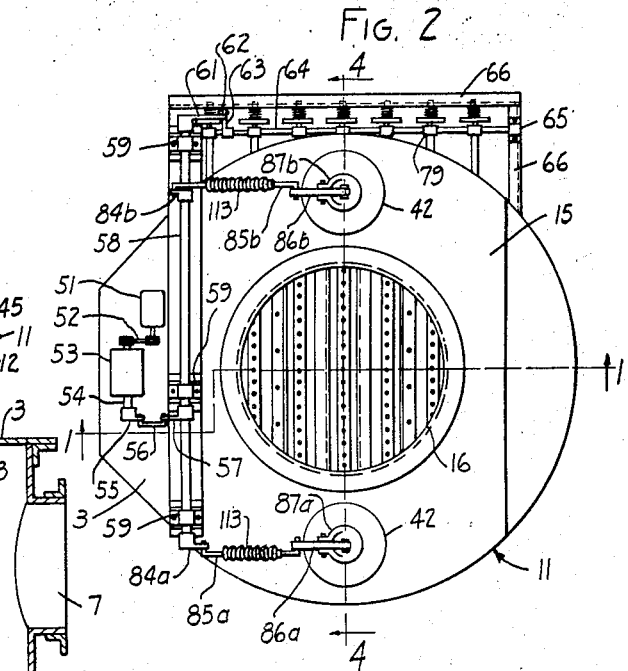
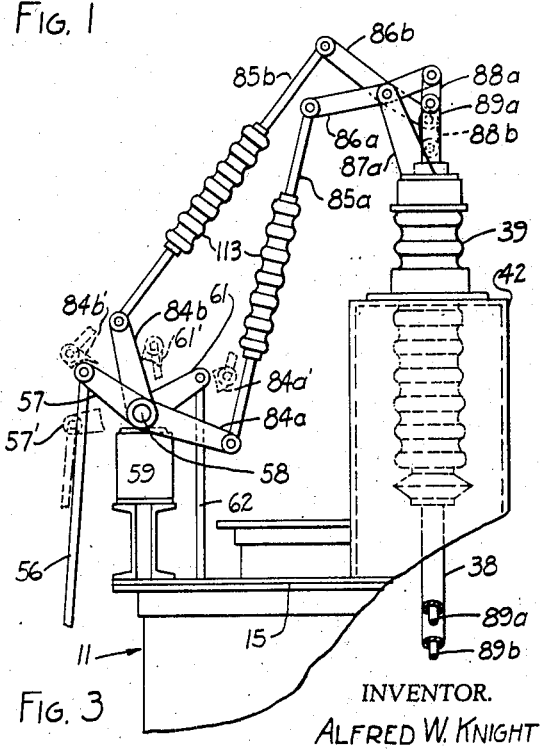
INVENTOR.
ALFRED W. KNIGHT
BY *Arthur P. Knight and Alfred W. Knight*
ATTORNEYS

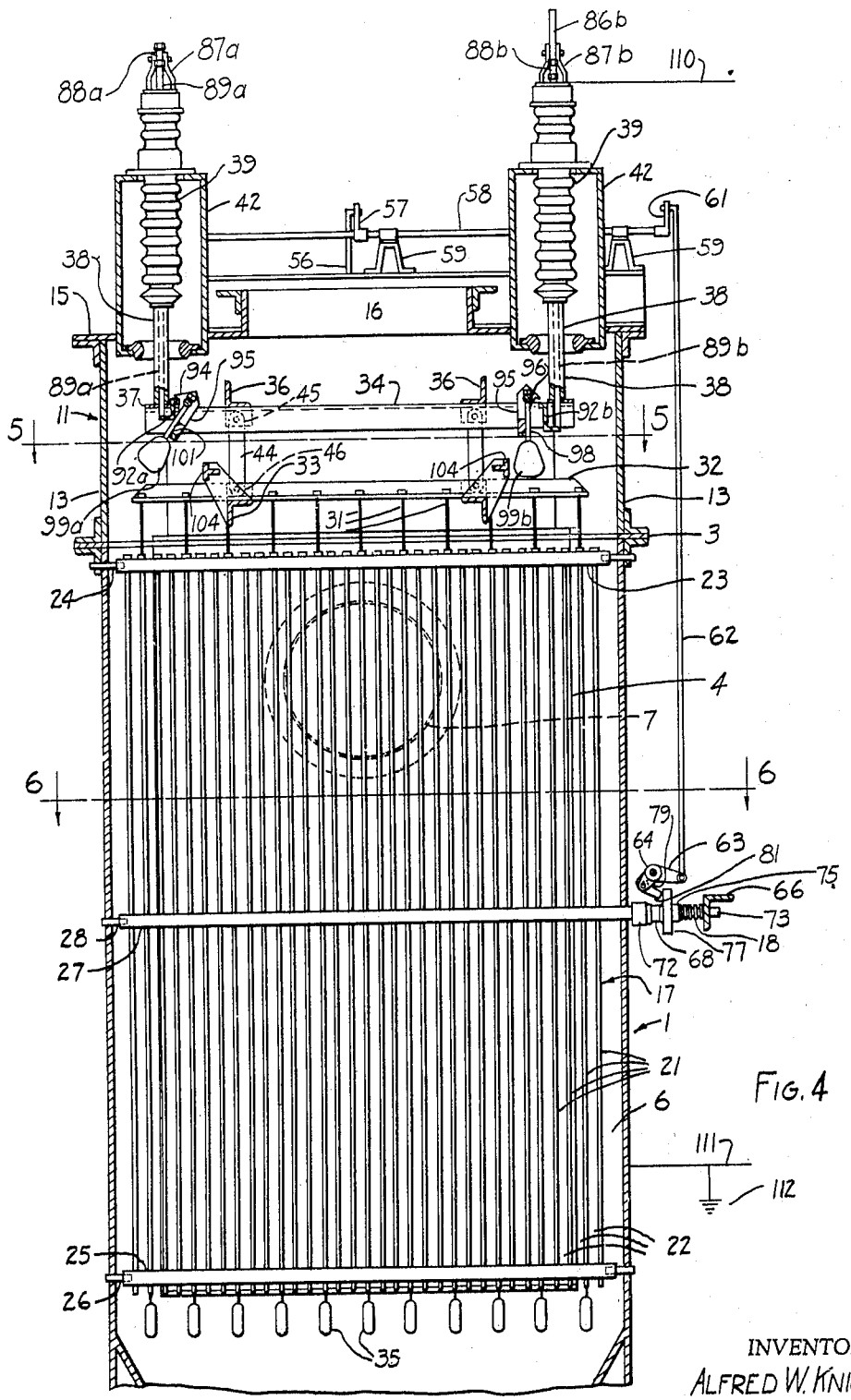

INVENTOR.
ALFRED W. KNIGHT

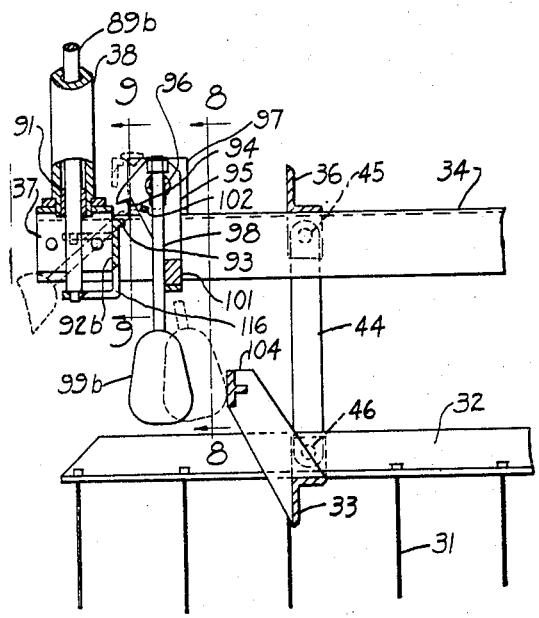
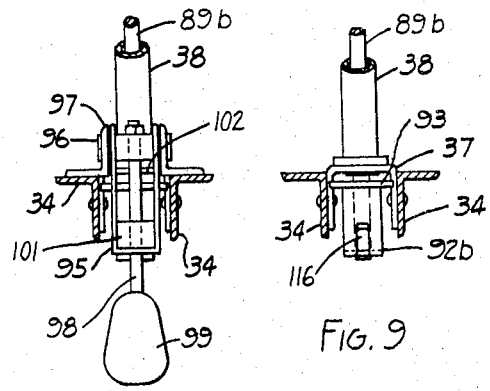
FIG. 7
FIG. 8
FIG. 9
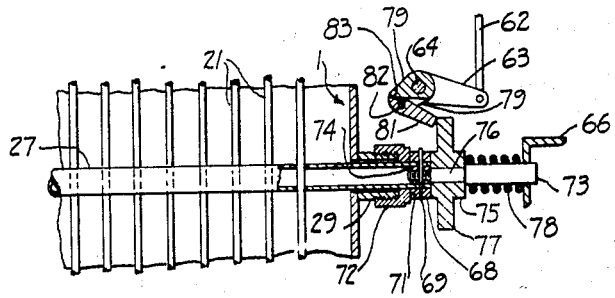
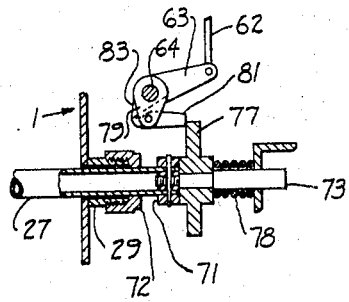
FIG. 10
FIG. 11
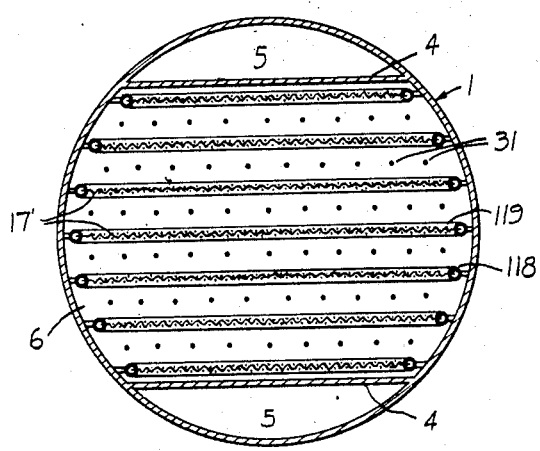
FIG. 12
INVENTOR.
ALFRED W. KNIGHT
BY *Arthur P. Knight and Alfred W. Knight*
ATTORNEYS Patented Nov. 20, 1934

1,981,455

UNITED STATES PATENT OFFICE 1,981,455

ELECTRICAL PRECIPITATOR

Alfred W. Knight, San Marino, Calif., assignor to International Precipitation Company, Los Angeles, Calif., a corporation of California Application March 14, 1932, Serial No. 598,853

8 Claims. (Cl. 183—7)

This invention relates to electrical precipitators for the removal of suspended material from gases, and more particularly to an improved form of electrical precipitator employing pervious collecting electrodes. For example, the invention may advantageously be applied to an electrical precipitator of the so-called "rod curtain" type, this type of precipitator being so named by reason of the fact that the collecting electrode units are formed as curtain-like structures each consisting of a plurality of small rods, pipes, wires, or other linearly extended members of relatively small diameter spaced sufficiently close together to substantially prevent electrical discharge therefrom, thereby enabling such curtains to act as passive or non-discharging electrode members of extended surface, in the same manner as the plates or pipes used in other types of electrical precipitators. The invention may also be applied to an electrical precipitator in which the collecting electrodes are formed as screens, it being essential to the invention that the collecting electrodes be pervious, so as to permit passage of gas therethrough, for the purpose of equally distributing the gas flow between all of said electrodes as hereinafter described.

The principal object of the invention is to provide an improved construction of an electrical precipitator of the above described type employing pervious collecting electrodes.

A further object of the invention is to provide an electrical precipitator adapted for vertical flow of gas through the precipitating field, provided with means for lateral inflow of gas into the interior of the precipitator below the precipitating field and discharge of gas from the upper portion of the precipitator, and employing pervious collecting electrodes in order to obtain uniform distribution of gas flow in all of the passages between said electrodes.

A further object of the invention is to provide a pervious collecting electrode precipitator of simple construction, adapted for vertical, or substantially vertical, flow of gas through the electrical field.

A further object of the invention is to provide an electrical precipitator which is rugged in construction and which may be readily modified in dimensions so as to provide for the handling of any desired gas volume.

A further object of the invention is to provide a vertical flow pervious electrode precipitator having advantageous means for introduction of the gas to be cleaned and for distribution of such gas in such manner as to cause the same to pass uniformly, in a substantially vertical direction, through all parts of the precipitating field.

A further object of the invention is to provide a precipitator of the above type having simple and effective means, of novel design, for mechanically rapping or jarring the collecting electrodes, and preferably also the discharge electrodes.

The general shape of the precipitator of the present invention, and the relative disposition of the precipitating chamber in which the electrodes are mounted and the passages for inflow and outflow of gas to and from said chamber, resemble quite closely the electrical precipitator disclosed in the United States patent of H. A. Wintermute et al, No. 1,798,511, and a further object of the invention is to provide an electrical precipitator which embodies many of the advantageous features of the precipitator shown in said patent and which, at the same time, provides an increased cross-sectional area of precipitating chamber, and consequently an increased gas flow capacity, in an apparatus of given total external dimensions.

In the form of electrical precipitator shown in said Wintermute et al. patent, the external housing of the precipitator is of substantially cylindrical shape, while the precipitating chamber is formed as a rectangular box-like internal casing inscribed within said cylindrical housing, that is to say, having its corners located substantially in contact with said cylindrical housing. The internal casing is open at its upper and lower ends, and the segment-shaped spaces provided between two of the opposing side walls of said inner casing and the outer housing are utilized as inlet passages for the gas. According to said patent, a plurality of collecting electrode plates are disposed vertically within said inner casing and extends perpendicular to said two opposing walls, so as to provide a plurality of ducts or passages therebetween, in which the discharge electrodes are mounted. The incoming gas passes downwardly in the above-mentioned inlet passages and then upwardly through said passages or ducts between the collecting electrode plates, and is discharged in cleaned condition from the upper part of the precipitator. With such a construction, the segment-shaped spaces provided between the remaining two side walls of the inner casing which extend parallel to the collecting electrode plates, and the wall of the outer housing, are not utilized for precipitation purposes and constitute substantially dead spaces or quiescent compartments.

In the precipitator of the present invention, the outer housing is also preferably of substantially cylindrical shape, but only two internal vertical partition plates are provided, said partition plates being substantially parallel to one another and spaced sufficiently from the opposing side wall portions of the cylindrical outer housing to provide segment-shaped inlet passages of the desired cross-sectional area. The precipitating chamber is thus inclosed at the sides thereof, being bounded on two sides by the above-mentioned partition plates and on the other two sides or ends by the portions of the cylindrical outer wall subtended between said plates. Within the precipitating chamber thus defined, there are provided a plurality of pervious collecting electrodes, extending parallel to one another and in vertical planes, and suitably spaced apart, and discharge electrode means of suitable construction are mounted between said collecting electrodes. It may be seen that the use of pervious collecting electrodes, instead of solid plates, is of particular advantage when it is attempted to use the entire cross-sectional area of the cylindrical housing, with the exception of the inlet flues, as a precipitating chamber, for the ability of the gas to pass through the individual electrode units permits a substantially uniform distribution of gas flow to be maintained in the ducts or passages between all of the collecting electrodes, despite the fact that certain of said ducts or passages are not directly contiguous, at their lower ends, to the lower ends of the inlet passages.

The accompanying drawings illustrate forms of apparatus embodying this invention, and referring thereto:

Fig. 1 is a vertical section of an electrical precipitator of the type employing rod curtain collecting electrodes, this view being taken on line 1—1 in Fig. 2.

Fig. 2 is a plan view of said precipitator.

Fig. 3 is a partial side elevation of the upper part of the precipitator, showing part of the rapping mechanism on an enlarged scale.

Fig. 4 is a vertical section on line 4—4 in Fig. 2.

Fig. 7 is a vertical section on line 7—7 in Fig. 1, showing part of the rapping mechanism for the discharge electrodes.

Fig. 8 is a section on line 8—8 in Fig. 7.

Fig. 9 is a section on line 9—9 in Fig. 7.

Fig. 10 is a partial vertical section on line 10—10 in Fig. 6, showing part of the rapping mechanism for the collecting electrodes.

Fig. 11 is a similar view, showing the parts in an intermediate position in the operation thereof.

Fig. 12 is a horizontal sectional view of a form of the invention provided with collecting electrodes formed as screens.

Figure 5:
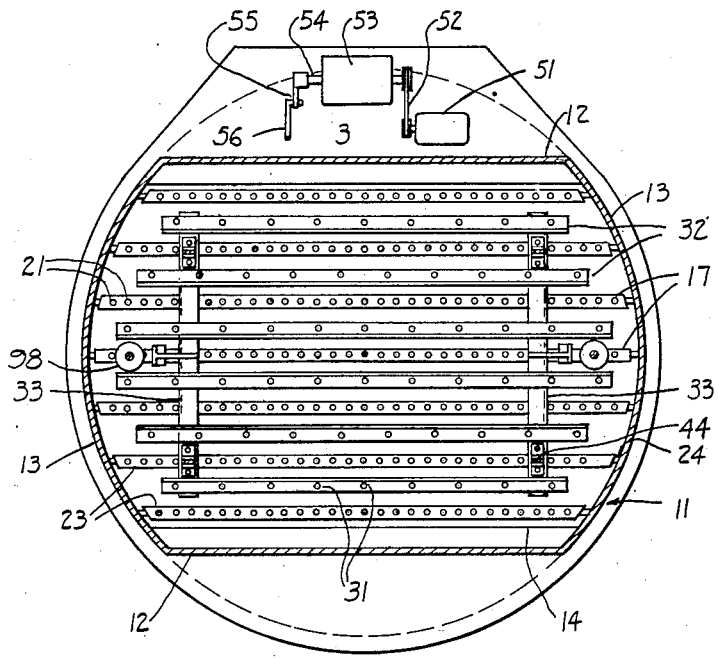
Fig. 5 is a horizontal section on line 5—5 in Fig. 4.

The outer housing 1 of the electrical precipitator is of cylindrical shape and is provided with a conical hopper 2 for collection and removal of the precipitated material, and with a top plate 3. Vertically disposed partition plates 4 extend across the interior of the housing 1, parallel to one another, and sufficiently spaced from the opposite sides of said housing to provide segment-shaped inlet passages 5 of the desired cross-sectional area. The side wall of the housing is provided with two inlet openings 7, at opposite sides thereof, leading into the inlet passages 5, and the gas to be cleaned may be delivered to said inlet openings through any suitable flues or conduits. The openings 7 are preferably located somewhat above the lower edges of partitions 4 and may, as shown, be adjacent the upper end of the housing 1. A precipitating chamber 6 is thus defined between the two partition plates 4 and between the portions 1a of the cylindrical housing subtended between said partition plates, the shape of this precipitating chamber being shown to best advantage in Fig. 6. The inlet passages 5 and precipitating chamber 6 are open at their lower ends, so that communication is established therebetween, below the lower edges of partitions 4, which are spaced sufficiently above the hopper 2 to permit free flow and distribution of the incoming gas.

An upper header or outlet chamber 11 is shown as provided above the precipitating chamber, said header comprising two parallel side walls 12 disposed above and parallel to, but preferably somewhat outwardly of, the respective partition plates 4, and curved end walls 13 of the same curvature as the cylindrical housing 1 and disposed substantially above the subtended portions 1a thereof. Said upper header, therefore, provides substantially an upward continuation of the precipitating chamber 6, but is shown as being of somewhat greater width than said precipitating chamber, so as to provide a somewhat enlarged space for housing the upper supporting frame of the discharge electrode system as hereinafter described. The top plate 3 of the main precipitator housing is provided with an opening 14 of substantially the same shape and size as the precipitating chamber 6, providing free communication from said precipitating chamber to the upper header 11. The top plate 15 of the upper header is provided with an outlet opening 16 which may be open to the atmosphere or may be connected to a suitable flue or stack for carrying off the cleaned gas.

Figure 6:
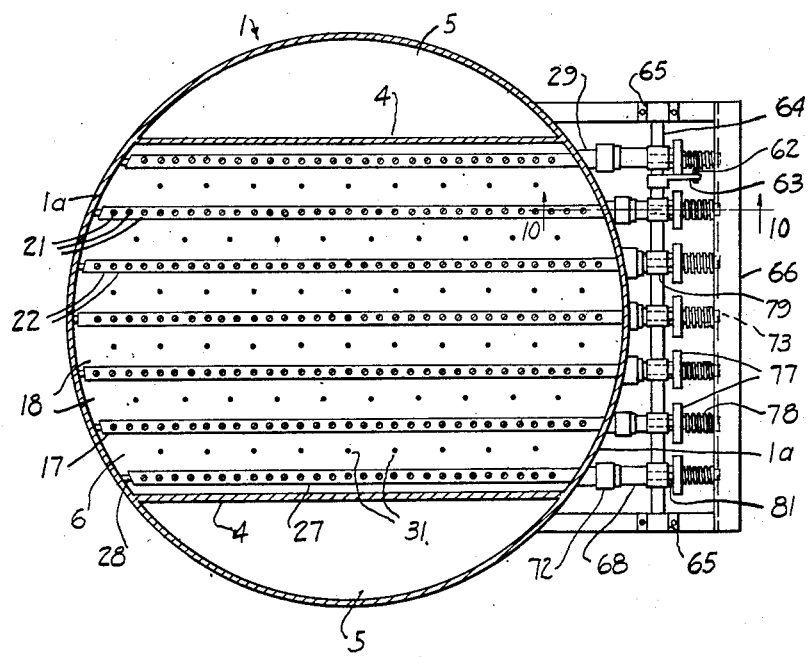
Fig. 6 is a horizontal section on line 6—6 in Fig. 4.

In the form of apparatus shown in Figs. 1 to 6 inclusive, a plurality of collecting electrodes 17 of the rod curtain type are disposed vertically and parallel to one another within the precipitating chamber 6, and the planes of said collecting electrodes are preferably parallel to the partition plates 4, as shown in Figs. 1, 5 and 6. Said collecting electrodes are suitably spaced from one another so as to provide a plurality of gas passages or ducts 18 therebetween. Said collecting electrodes extend substantially across the entire width of the housing 1 in a direction parallel to the plates 4, so that the collecting electrodes are of varying lengths, those near the central portion of the precipitator being of somewhat greater length in this direction than those further removed from the center and adjacent the respective partition plates. It may be seen from Fig. 6, that such a construction enables substantially the entire cross-sectional area of the precipitator housing to be used as a precipitating chamber, with the exception of the area of the two inlet passages 5. Each of the collecting electrode curtains comprises a plurality of vertically extending rods or pipes 21 of small diameter, spaced somewhat apart from one another so as to provide openings 22 therebetween, but sufficiently close together to substantially prevent electric discharge therefrom and provide an electrode unit which acts electrically in substantially the same manner as a solid plate of extended area. The linear elements 21 of each collecting electrode are shown as supported at their upper ends on a horizontal rod, pipe, or other supporting member 23, and said supporting members may be supported at their ends in any suitable manner, as for example by means of pins 24 secured to the side wall of housing 1. The lower end portions of the linear electrode elements 21 extend loosely through fairly close fitting openings in rods, pipes, or other horizontal spacing members 25 which are also shown as supported on pins 26 secured to the side wall of the housing. Said elements 22 are also shown as extending loosely through fairly close fitting openings in horizontally disposed spacing and rapping members 27, consisting for example of pipes or rods, at a level intermediate the members 23 and 25, for example, substantially midway therebetween. The members 27 may be loosely mounted at one end on pins 28 secured to housing 1, so as to permit longitudinal movement of said members 27, and the other ends of said members extend out through the side wall of the housing, through sleeves 29, for engagement by suitable rapping mechanism as hereinafter described.

The discharge electrode elements are shown as comprising wires or rods 31 of small diameter disposed in vertical planes midway between the respective collecting electrodes 17, said elements being suspended vertically from supporting bars 32 and provided at their lower ends with tensioning weights 35. Said bars 32 are in turn mounted on transverse bars 33, and means are shown for movably supporting the frame constituted by members 32 and 33, within the upper header 11, and for jarring or vibrating said frame, for the purpose of jarring or vibrating the discharge electrode system. A rigid supporting frame comprising longitudinal bars or members 34 and transverse bars or members 36 is provided above the supporting members 32 and 33, said longitudinal members 34 being secured adjacent their ends to supporting brackets 37, which are in turn carried by supporting sleeves 38 which extend through and are supported upon insulating bushings 39. The top plate 15 of the upper header 11 is provided with insulator compartments 42 through which said insulating bushings extend, said insulator compartments serving to partially isolate the insulators 39 from the main gas stream and thus minimize or substantially prevent deposition of suspended material on the surfaces of said insulator, in the usual manner of such apparatus.

Straps or hangers 44 are pivotally connected at their upper ends as at 45 to the transverse members 36 of the rigid supporting frame and pivotally connected at their lower ends as at 46 to the transverse members 33 of the movable supporting frame, thus permitting the latter to be swung or vibrated laterally by operation of the rapping means hereinafter described.

The rapping mechanism is shown as comprising an electric motor 51 operatively connected through drive chain 52 and speed-reducing means 53 to a shaft 54 carrying lever arm 55. All of said parts may be mounted on the top plate 3, at one side of the upper header 11. Lever arm 55 is connected through link 56 to a lever arm 57 on another shaft 58 which is rotatably mounted on suitable bearing supports 59 secured to the top plate 15 of the upper header. The lever arm 57 is of somewhat greater length than lever arm 55, so that rotative movement of shaft 54 serves to effect oscillatory movement of shaft 58 through a certain angle, between the position of lever 57 approximately as shown in full lines in Figs. 1 and 3, and some such position as shown in dotted lines at 57' in Fig. 3.

Shaft 58 is provided at one end with a lever arm 61 which is connected by link 62 to a lever arm 63 on shaft 64 rotatably mounted in bearing supports 65 on supporting frame 66 secured to the precipitator housing 1.

Shaft 64 extends above the projecting ends of the several rapping members 27. A sleeve 68 is secured over the outer end portion of each of said rapping members 27, being fastened thereto, for example, by means of pin 69 as shown or in any other suitable manner, and the inner face 71 of said sleeve constitutes a stop shoulder bearing against the outer face of a threaded cap member 72 secured to the corresponding sleeve 29. An extension stem 73 is also secured to the outer end of each member 27, for example, by threaded engagement with an inner sleeve 74, said inner sleeve and extension stem being also shown as held by the pin 69 above-mentioned. A head member 75 is also mounted on a reduced portion 76 of stem 73, and said head member is provided with a flange 77. A compression spring 78 is disposed around stem 73, and bears at one end against the frame member 66 and at the other end against head member 75, so as to normally hold shoulder 71 in position against cap 72. Shaft 64 is provided with a plurality of lever arms 79 each having a cam member 81 pivotally mounted thereon as at 82. Each of said cam members 81 is biased by its own weight toward a position of engagement with a shoulder portion 83 of the corresponding lever arm 79, and is positioned to engage the flange 77 of the corresponding rapping member 27 and move the same from the position shown in Fig. 10 to the position shown in Fig. 11 upon rotation of shaft 64 in a counter-clockwise direction, as may be seen from a comparison of said figures. The operation of the above mechanism will be described more fully hereinafter.

The same driving means as above described may also be utilized to operate suitable rapping mechanism for the discharge electrodes. For this purpose, shaft 58 is shown as also provided with two lever arms 84a and 84b operatively connected by links 85a and 85b to bell cranks 86a and 86b pivotally mounted on brackets 87a and 87b on the respective insulating bushings 39. The other arms of the bell cranks 86a and 86b respectively, are connected by links 88a and 88b, to the upper ends of rods 89a and 89b which extend through the respective supporting sleeves 38 and through suitable packing means 91 within the lower ends of said sleeves. The lower ends of the rods 89a and 89b are provided respectively with lifting cams 92a and 92b adapted to slide vertically within and along side of the respective brackets 37. Each of said lifting cams is provided with a portion 93 adapted, upon upward movement thereof to engage projections 94 on a yoke 95 pivotally mounted on shaft 96 which is in turn pivotally supported on brackets 97 secured to frame members 34. An arm 98 is secured to shaft 96 and is provided with an impact member or hammer 99a or 99b. Yoke 95 is provided with a block 101 adapted to engage and lift arm 98 upon raising of said yoke by the corresponding lifting cam as hereinafter described, and may also be provided with a stop member 102 adapted to limit the relative movement of said arm with respect to said yoke. An anvil member 104 is mounted in position for engagement by each of the hammers 99a and 99b, and said anvil members are secured to the respective transverse frame members 33 of the movable frame, so as to cause the movable frame to be alternately jarred in reverse directions upon engagement of the respective hammers with the corresponding anvil members, as hereinafter described. It will be observed from Figs. 1, 2, 3 and 4, that the relative positions of the operating mechanism for the respective hammers 99a and 99b are reversed, so as to cause alternate lifting and dropping of said hammers, for the above purpose.

It will be understood that the discharge and collecting electrodes are connected to the opposite terminals of a suitable source of electric current at high potential so as to maintain the necessary high potential electric field between said electrodes for effecting electrical precipitation, said source being preferably a unidirectional current source, so as to maintain a unidirectional field between the electrodes. The connection to the discharge electrodes may be made, for example, by means of a wire or conductor 110 connected to the upper end of one of the supporting sleeves 38, while the connection to the collecting electrodes may be made by means of a wire or conductor 111 connected to the precipitator housing 1 which is in electrical connection with said collecting electrodes, said collecting electrodes, as well as housing 1 and conductor 111, being preferably grounded, as indicated at 112. Since the discharge electrode system and the rapping mechanism therefor, above described, are thus maintained at a high electrical potential with respect to the ground, and since the driving means 51, 53, etc., and shaft 58 for operating the rapping mechanism are mounted directly on the grounded housing, it is necessary to provide an insulating connection between shaft 58 and the lifting rods 89a and 89b, and for this purpose, insulators 113 may be connected in the respective links 85a and 85b.

In the operation of the above-described apparatus, the gas to be cleaned is introduced through inlet openings 7 and flows downwardly through passages 5, beneath the lower edges of partition plates 4, and is then deflected inwardly and upwardly, and passes up through the precipitating chamber 6. The fact that the gas is deflected through substantially 180° in passing from the inlet passages 5 to the precipitating chamber 6 tends to cause fairly uniform distribution of such gas through the passages 18 between all of the collecting electrodes 17, but even if the initial upward gas flow is not uniform at the lower ends of all of said passages, sufficient interflow of gas between said passages takes place through the openings 22 between the individual elements 21, so as to quickly establish uniform gas flow. For this reason, the upward velocity of gas, and consequently the volumetric rate of gas flow, through the respective ducts or passages 18, is substantially uniform throughout the major portion of the height of the precipitating chamber.

The reversal in direction of gas flow in passing beneath the lower edges of partition plates 4 causes mechanical separation, by inertia, of a considerable portion of the coarser suspended material, which is received in the hopper 2. As the gas passes upwardly through the precipitating field the remaining suspended particles become electrically charged and are precipitated, principally upon the surfaces of the collecting electrodes 17. The clean gas, relatively free from suspended material, then passes through the upper header 11 and is discharged through outlet opening 16.

The material precipitated on the collecting electrodes may, to a considerable extent, become naturally dislodged from the surfaces of said electrodes, and fall by gravity into the hopper 2. In case this natural falling of the material from the electrodes is sufficient to keep the surfaces thereof in sufficiently clean condition for satisfactory operation, it will not be necessary to provide means for rapping or jarring the electrodes, but in many cases such rapping or jarring means are necessary, and for this purpose the electrode rapping means above described may advantageously be used. The operation of the rapping means for the collecting electrodes, is as follows: Motor 51 runs continuously, or at least during such periods as it is desired to operate the rapping mechanism. Said motor operates through the means above described to cause oscillation of lever 57 on shaft 58, between a raised position such as indicated in full lines in Fig. 3, and a lowered position such as indicated in dotted lines at 57' in said figure. The resulting oscillation of shaft 58 also causes lever 61 to oscillate between the position shown in full lines in Fig. 3 and the position shown in dotted lines at 61'. This movement of lever 61 operates through link 62 to raise and lower lever 63 and consequently cause shaft 64 to rotate from a position such as shown in Fig. 10 to and somewhat beyond the position shown in Fig. 11, and to then return to its original position. In the operating movement of shaft 64, each of the levers 79 is rotated in a counter-clockwise direction in Figs. 10 and 11, and the corresponding cam members 81 engage flanges 77 and force the same outwardly, compressing spring 78. This outward movement of flanges 77 causes the rapping members 27 to be drawn somewhat to the right in Figs. 4 and 10. The central portions of the collecting electrode elements 21 are also moved in this same direction by engagement of members 27 therewith, thus causing a certain bending or flexing of said members 21. During this movement, the shoulder 71 is also drawn out of engagement with cap member 72. It will be understood that the pins 28 project into the pipes 27 sufficiently to slidingly engage and support said pipes throughout this outward movement thereof. When the parts reach a position somewhat beyond that shown in Fig. 11, the pressure of flange 77 against cam member 81 causes said cam member to suddenly fly upwardly, and out of engagement with shoulder 83, thus permitting spring 78 to suddenly force rapping member 27 and collecting electrode elements 21 to the left, until shoulder 71 strikes cap member 72. Due to the bending or flexing of the collecting electrode elements, and also to the sudden striking of shoulder 71 against cap member 72, a very effective vibration is thus imparted to the collecting electrode elements 21 and the precipitated material is dislodged therefrom and falls to the hopper 2 at the bottom of the precipitator. In the return movement of shaft 64, in a clockwise direction, cam member 81 is free to swing about pivot 82, and rides over flange 77, until it passes beyond said flange and returns to its original position.

The rapping mechanism shown is also adapted to effect continuous rapping or jarring of the discharge electrode system, as follows: When the parts are in the positions shown in Figs. 1 to 4 inclusive, rapping hammer 99a is in raised position and rapping hammer 99b is in lowered position. At this time, shaft 58 is still moving in a clockwise direction in Fig. 3, resulting in a slight further downward movement of link 85a and raising of the left cam 92a, through rod 89a, until said cam releases yoke 95 and permits hammer 99a to swing downwardly and strike anvil member 104. This jars the movably mounted supporting frame and the discharge electrodes mounted thereon, causing these parts to swing to the right in Fig. 4, on strips 44. A sharp vibration or swinging movement is thus imparted to the discharge electrode system. As the shaft 58 swings back in a counter-clockwise direction in Fig. 3, lever 84b is moved to the position shown in dotted lines at 84b' and operates through link 85b and bell crank 86b to raise rod 89b and lift cam 92b. Referring particularly to Fig. 7, it will be seen that as cam 92b is raised, the projecting portion 93 thereof will engage projections 94 and raise yoke 95 and the hammer 99b carried thereby. It will be seen that the lifting cams 92a and 92b are slotted as indicated at 116, so as to permit this upward swinging movement of the hammer arm 98, said arm entering this slot during said upward movement. When these parts reach the raised position indicated in dotted lines, a slight further upward movement causes the portion 93 to release projections 94 and thus permits yoke 95 and hammer 99b to swing downwardly, causing said hammer to strike anvil member 104, and again jar the discharge electrode system by means of a blow delivered in the reverse direction to that delivered by hammer 99a. During the upward movement of hammer 99b, lever 84a moves to the position indicated in dotted lines 84a' in Fig. 3, which operates through link 85a and bell crank 86a to lower rod 89a and cam 92a. In this downward movement the projecting portion 93 is permitted to move past the projections 94 and the corresponding yoke 95. During this downward movement said yoke is swung outwardly without requiring movement of the hammer therewith, due to the loose mounting of said yoke on the hammer shaft 96. In the continued downward movement of cam member 92a it passes out of engagement with projections 94 and permits yoke 95 to return to its normal position, ready for the next operation. It will be seen that the mechanism thus operates to jar or vibrate the discharge electrode system by means of blows delivered alternately in reverse directions, and that the discharge electrode system is free to swing laterally when so jarred, and a very effective removal of any deposited material from all of the surfaces of the discharge electrodes is thus obtained.

In the modification of the invention shown in Fig. 12, the construction of the cylindrical housing 1, partition plates 4, inlet passages 5 and precipitating chamber 6, may be the same as above described. In this case, however, the collecting electrode units consist of vertically disposed screens 17' mounted in the same relative positions as the rod curtain electrodes 17 above described. Said screens are shown as provided with side frame members 118 and bottom frame members 119, supported upon the precipitator housing in any suitable manner. The discharge electrode members 31 are disposed in the same relative positions, and may be supported in substantially the same manner, as in the first form of the invention. It will be understood that, if desired, rapping means such as above described, or of any other suitable type, may be provided for rapping both the collecting and discharge electrodes.

The operation of this form of the invention is substantially the same as above described, the openings in the screens 17' serving as before to permit inflow of gas between the several passages, and thus provide substantially uniform distribution of gas flow throughout the cross-section of the precipitating chamber, and throughout substantially the entire height thereof.

I claim:—

1. In an electrical precipitator a vertical cylindrical casing, two parallel vertical partition members extending across the interior of said casing and defining with the respective arcuate portions of the casing subtended thereby two segment-shaped inlet passages, and defining with the arcuate portions of the walls of the casing therebetween a chamber occupying substantially the entire cross-sectional area of said casing with the exception of said segment-shaped inlet passages, said casing having inlet openings therein communicating with said inlet passages and being provided with a space beneath said partition members establishing communication between the lower ends of said inlet passages and said chamber, means closing the upper end of said passages, a plurality of pervious collecting electrode members disposed in said chamber in parallel vertical planes and extending substantially entirely across said chamber from one wall portion thereof to the other and substantially filling the entire cross-sectional area of said chamber, discharge electrode means disposed between said collecting electrode members, the upper end of said casing being provided with gas outlet means communicating with the upper end of said chamber, and means for maintaining an electrical potential between said discharge and collecting electrodes.

2. In an electrical precipitator a vertical cylindrical casing, two parallel vertical partition members extending across the interior of said casing and defining with the respective arcuate portions of the casing subtended thereby two segment-shaped inlet passages, and defining with the arcuate portions of the walls of the casing therebetween a chamber occupying substantially the entire cross-sectional area of said casing with the exception of said segment-shaped inlet passages, said casing having inlet openings therein communicating with said inlet passages and being provided with a space beneath said partition members establishing communication between the lower ends of said inlet passages and said chamber, means closing the upper end of said passages, a plurality of pervious collecting electrode members disposed in said chamber in parallel vertical planes parallel to said partition members and extending substantially entirely across said chamber from one arcuate wall portion thereof to the other, discharge electrode means disposed between said collecting electrode members, the upper end of said casing being provided with gas outlet means communicating with the upper end of said chamber, and means for maintaining an electrical potential between said discharge and collecting electrodes.

3. In an electrical precipitator, a casing, a plurality of collecting electrode units disposed in parallel vertical planes within said casing and each comprising a plurality of closely spaced rods normally extending substantially vertically, means for moving the central portion of said rods laterally in the planes of the respective units, so as to flex said rods, and means for suddenly returning said rods to normal position.

4. An apparatus as set forth in claim 3 and comprising, in addition, stop means, and means connected to said collecting electrode units and adapted to engage said stop means upon said sudden return movement of said rods, so as to suddenly stop said movement.

5. In an electrical precipitator, a casing having side walls inclosing a precipitating chamber, a plurality of collecting electrode units disposed in parallel vertical planes and extending across said precipitating chamber, rapping members engaging the respective collecting electrode units and extending through a side wall of said casing at one end of said units, means operatively engaging said rapping members exteriorly of said casing and adapted to suddenly jar said rapping members by means of impulses delivered thereto in a substantially horizontal direction parallel to the length of the respective collecting electrode units, and discharge electrode means disposed between the respective collecting electrode units.

6. In an electrical precipitator, a casing, a plurality of collecting electrode units disposed in parallel vertical planes within said casing, fixed supporting means mounted within said casing above said collecting electrodes, a movable supporting frame mounted on said fixed supporting means in such manner as to permit lateral swinging movement thereof in a direction parallel to the planes of said collecting electrode units, discharge electrode means supported on said movable supporting frame so as to move therewith and extending between the respective collecting electrode units, impact receiving means on said movable supporting frame, and hammer means operable to strike said impact-receiving means so as to cause swinging movement of said movable supporting frame and discharge electrode means in said direction.

7. An apparatus as set forth in claim 6, said hammer means comprising two hammer members operable to strike said impact-receiving means in opposite directions, and said apparatus further comprising means for effecting alternate operation of said hammer members.

8. In an electrical precipitator, a cylindrical casing, two vertical partition members extending across the interior of said casing somewhat inwardly from opposite sides thereof and parallel to one another so as to provide two oppositely disposed segment-shaped inlet passages between said partition members and said opposite side wall portions of the casing, said partition members and the arcuate portions of the side wall of the casing subtended therebetween serving to define a precipitating chamber occupying substantially the entire cross-sectional area of said casing with the exception of said segment-shaped inlet passages, a plurality of collecting electrode units disposed in planes parallel to said partition members and extending substantially entirely across the length of said precipitating chamber between said arcuate portions of the casing, rapping members engaging the respective collecting electrode units and extending through the arcuate portion of the casing at one end of said collecting electrode units, means operatively engaging said rapping members exteriorly of said casing and adapted to jar said rapping members and collecting electrode units, and discharge electrode means disposed between the respective collecting electrode units.

ALFRED W. KNIGHT.